2,955,911
PREPARATION OF ALKALI METAL TRIBOROHYDRIDES

Lawrence J. Edwards, Zelienople, and William V. Hough, Butler, Pa., assignors to Callery Chemical Company, Pittsburgh, Pa., a corporation of Pennsylvania No Drawing. Filed Mar. 19, 1956, Ser. No. 572,205

5 Claims. (Cl. 23—14)

This invention relates to the preparation of alkali metal triborohydrides ($MB_3H_8$) and more particularly to the preparation of sodium triborohydride, $NaB_3H_8$, by the reaction of an alkali metal such as sodium or an alkali metal hydride such as sodium hydride with tetraborane in a lower dialkyl ether.

The alkali metal triborohydrides ($MB_3H_8$) and sodium triborohydride ($NaB_3H_8$) are described in our co-pending application and also published at J.A.C.S., 78, page 689. The alkali metal triborohydrides because of their high content of hydridic hydrogen and because of their solubility in a variety of solvents in which the simple borohydrides ($MBH_4$) are not soluble make them quite useful as reducing agents. For example, sodium triborohydride reduces acetone to isopropanol and nitro-benzene to azobenzene as well as reducing other compounds which are reduced by sodium borohydride. Sodium triborohydride is also useful in the reduction of metal ions. Sodium triborohydride reduces most higher valence state metal ions to a lower valence state or to the free metal, e.g. $Fe^{+++}$ to $Fe^{++}$, $Cu^+$ or Cu, $Ag^+$ to Ag.

It is therefore one object of this invention to provide a new and improved method for the preparation of alkali metal triborohydrides by reaction of an alkali metal or alkali metal hydride with tetraborane in an inert solvent for the alkali metal triborohydride.

Another object is to provide a method for the preparation of alkali metal triborohydrides by reaction of an alkali metal or an alkali metal hydride and tetraborane in a lower dialkyl ether.

Another object of this invention is to provide an improved process for the preparation of sodium triborohydride by the reaction of sodium or sodium hydride and tetraborane in a lower dialkyl ether.

Other objects of this invention will become apparent from time to time throughout the specification and claims as hereinafter related.

This invention comprises a new and improved process for the preparation of alkali metal triborohydrides such as sodium triborohydride which will be described more fully hereinafter and the novelty of which will be particularly pointed out and distinctly claimed.

This invention is based upon the discovery that an alkali metal such as sodium or an alkali metal hydride such as sodium hydride will react with tetraborane ($B_4H_{10}$) in an inert solvent for the alkali metal triborohydride, such as diethyl ether or other lower dialkyl ethers, to produce an alkali metal triborohydride. This reaction takes place rapidly, produces the alkali metal triborohydride in much greater quantities than is possible using prior processes, and produces a product substantially free from contaminating by-products.

In a series of experiments sodium amalgam and a slight excess of tetraborane were placed in a sealed tube together with a volume of diethyl ether approximately equal to the volume of sodium amalgam used. The sealed tube was maintained at room temperature and agitated by a wrist-action shaker. At the end of the reaction time no insoluble matter remained except the mercury with which the sodium was added. The sealed tube was then opened and the ether solution of reaction products separated from the mercury. A solid material was obtained upon evaporation of the ether which had a sodium-boron-hydrogen analysis corresponding to $NaB_3H_8$. The X-ray diffraction pattern and infra-red spectrum of this reaction product corresponded to the X-ray and infra-red data previously obtained for the compound sodium triborohydride. The data from these runs are shown in Table I.

Table I

| Run No. | 1 | 2 | 3 | 4 | 5 | 6 | 7 |
|---|---|---|---|---|---|---|---|
| Reaction Time (Hrs.) | 5 | 5 | 5 | 16 | 16 | 20 | 40 |
| Na charged (mmols) | 3.44 | 2.91 | 3.09 | 4.06 | 4.42 | 3.84 | 4.08 |
| $B_4H_{10}$ charged (mmols) | 7.60 | 8.19 | 6.46 | 5.86 | 8.85 | 6.11 | 6.13 |
| $NaB_3H_8$ recovered (mmols) | 3.44 | 2.91 | 3.09 | 4.06 | 4.42 | 3.84 | 4.08 |
| $B_4H_{10}$ recovered or accounted for in known side reactions (mmols) | 4.16 | 5.28 | 3.37 | 1.80 | 4.43 | 2.27 | 2.05 |

Mmols=millimols.

As indicated by the above table the yields of $NaB_3H_8$ were quantitative based on the sodium charged.

The pressure at which this reaction is carried out does not appear to be critical. The temperature of this reaction, however, must be maintained below the temperature at which a substantial decomposition of tetraborane occurs. In other experiments it has been found that sodium triborohydride is readily produced by the reaction of a sodium dispersion in an inert reaction medium with tetraborane in the presence of a small amount of a lower dialkyl ether such as diethyl ether.

In another series of experiments, shown in Table II, sodium hydride was allowed to react with tetraborane in diethyl ether solution. The sodium hydride and a slight excess of tetraborane were added to diethyl ether in a sealed tube. The sealed tube containing the reactants was maintained at room temperature for two hours. At the end of 2 hours the sealed tube was opened, the solution recovered, and the solvent evaporated therefrom. The solid residue which remained was a white solid which was proved by X-ray and infra-red analyses to be a substantially pure sodium triborohydride. The yield obtained in this process is quantitative based upon the reaction $NaH + B_4H_{10} = 1/2 B_2H_6 + NaB_3H_8$.

Table II

| Run No. | 1 | 2 |
|---|---|---|
| Reaction Time (Hrs.) | 2 | 2 |
| NaH charged (mmols) | 3.38 | 5.75 |
| $B_4H_{10}$ charged (mmols) | 9.00 | 10.42 |
| $NaB_3H_8$ recovered (mmols) | 3.38 | 5.75 |
| $B_4H_{10}$ recovered or accounted for in known side reactions (mmols) | 5.62 | 4.67 |

While this invention has been described with special emphasis upon the use of metallic sodium and sodium hydride for reaction with tetraborane it will be obvious to those skilled in the art that other alkali metals and alkali metal hydrides may be used in similar reactions to produce other alkali metal triborohydrides. An application directed to related subject matter was filed by us on March 19, 1956, and was given Serial No. 572,265.

Having thus described this invention as required by the patent statutes we wish it understood that within the scope of the appended claims this invention may be practiced otherwise than as specifically described.

What we desire to claim and secure by Letters Patent of the United States is:

1. A method of preparing alkali metal triborohydrides which comprises reacting an alkali metal with tetraborane in the presence of an appreciable amount of a lower dialkyl ether and recovering the alkali metal triborohydride produced.

2. A method according to claim 1 in which the ether used is diethyl ether.

3. A method according to claim 1 in which sodium amalgam is reacted with tetraborane.

4. A method according to claim 1 in which a dispersion of sodium metal in an inert liquid is reacted with tetraborane.

5. A method of preparing sodium triborohydride which comprises reacting sodium amalgam with tetraborane in diethyl ether and recovering sodium triborohydride from the ether solution which is produced.

References Cited in the file of this patent

UNITED STATES PATENTS 2,545,633    Schlesinger et al. _____ Mar. 20, 1951

OTHER REFERENCES

Hydrides of Boron and Silicon, by Alfred Stock; Cornell University Press, Ithaca, N.Y. (1933), pp. 139–140.

"Reactions of Diborane with Alakali Metal Hydrides and Their Addition Compounds. New Syntheses of Borohydrides, Sodium and Potassium Borohydrides," by H. I. Schlesinger et al., Journal of the American Chemical Society, vol. 75, pp. 199–204 (1953).

Hurd: "Chemistry of the Hydrides," New York, John Wiley and Sons, Inc., 1952, p. 86.